United States Patent
Yuan et al.

(10) Patent No.: US 9,653,992 B2
(45) Date of Patent: May 16, 2017

(54) CONSTANT ON-TIME SWITCHING CONVERTER WITH ADAPTIVE RAMP COMPENSATION AND CONTROL METHOD THEREOF

(71) Applicant: Chengdu Monolithic Power Systems Co., Ltd., Chengdu (CN)

(72) Inventors: Wei Yuan, Hangzhou (CN); Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 16 days.

(21) Appl. No.: 14/691,247

(22) Filed: Apr. 20, 2015

(65) Prior Publication Data

US 2015/0311798 A1    Oct. 29, 2015

(30) Foreign Application Priority Data

Apr. 23, 2014  (CN) .......................... 2014 1 0165759

(51) Int. Cl.
| | | |
|---|---|---|
| *G05F 1/40* | (2006.01) | |
| *H02M 3/156* | (2006.01) | |
| *H02M 1/00* | (2006.01) | |

(52) U.S. Cl.
CPC .... *H02M 3/156* (2013.01); *H02M 2001/0022* (2013.01); *H02M 2001/0025* (2013.01)

(58) Field of Classification Search
CPC ......... H02M 3/156; H02M 2001/0025; H02M 3/1563; H02M 1/4225; Y02B 70/16

USPC ............. 323/271, 276, 282–288; 363/97–98, 363/123–126
See application file for complete search history.

(56) References Cited

U.S. PATENT DOCUMENTS

| | | | | |
|---|---|---|---|---|
| 6,707,283 B1* | 3/2004 | Ball | ................ | H02M 3/33507 323/284 |
| 7,109,692 B1* | 9/2006 | Wu | ........................ | H02M 1/44 323/282 |
| 7,342,392 B2* | 3/2008 | Liao | ........................ | H02M 1/08 323/282 |
| 8,120,345 B2* | 2/2012 | Akiyama | ............... | H02M 3/156 323/282 |
| 8,319,487 B2* | 11/2012 | Michishita | ............ | H02M 3/156 323/223 |

(Continued)

*Primary Examiner* — Rajnikant Patel
(74) *Attorney, Agent, or Firm* — Perkins Coie LLP

(57) ABSTRACT

A COT switching converter includes a first switch, a second switch, an inductor, an on-time control circuit configured to generate an on-time control signal, a ramp compensation generator configured to generate a compensation signal, a comparing circuit, a logic circuit, a driving circuit and a feed forward circuit configured to generate a compensation control signal based on the input voltage of the switching circuit. The comparing circuit compares the sum of the compensation signal and a feedback signal with a reference signal to generate a comparison signal. Based on the on-time control signal and the comparison signal, the logic circuit generates a control signal with a duty cycle to drive the first and second switches through the driving circuit. The ramp compensation generator adjusts the compensation signal based on the compensation control signal, so the amplitude of the ramp compensation signal can follow a critical value proportional to the difference between the duty cycle and the square of the duty cycle.

12 Claims, 10 Drawing Sheets

(56) References Cited

U.S. PATENT DOCUMENTS

| | | | |
|---|---|---|---|
| 8,575,908 B2 * | 11/2013 | Qiu | H02M 3/156 |
| | | | 323/222 |
| 8,880,969 B2 * | 11/2014 | Xi | H02M 3/156 |
| | | | 714/734 |
| 9,236,801 B2 * | 1/2016 | Ouyang | H02M 3/158 |
| 9,300,212 B2 * | 3/2016 | Notman | H02M 3/1588 |
| 2010/0134080 A1 | 6/2010 | Ouyang | |
| 2010/0181983 A1 | 7/2010 | Ouyang | |
| 2012/0146606 A1 | 6/2012 | Li et al. | |
| 2013/0257399 A1 | 10/2013 | Jiang et al. | |
| 2014/0035654 A1 | 2/2014 | Jiang et al. | |

* cited by examiner

CONSTANT ON-TIME SWITCHING CONVERTER WITH ADAPTIVE RAMP COMPENSATION AND CONTROL METHOD THEREOF

CROSS-REFERENCE TO RELATED APPLICATIONS

This application claims the benefit of CN application 201410165759.5 filed on Apr. 23, 2014, and incorporated herein by reference.

TECHNICAL FIELD

The present invention generally relates to electronic circuits, and more particularly but not exclusively to constant on-time switching converters and control methods thereof.

BACKGROUND

COT (constant on-time) control method is widely used in power supply area due to its simple structure and excellent transient response. Nevertheless, for switching converters with COT control, there may be a sub-harmonic oscillation at the output voltage because of the insufficient ESR (equivalent series resistance) of the output capacitor.

To avoid this sub-harmonic oscillation, a compensation signal in phase with the inductor current is often employed. FIG. 1 illustrates a schematic of a prior COT switching converter 100, wherein a ramp compensation generator consisting of a resistor Rramp and a capacitor Cramp is coupled to the inductor L in parallel. The compensation signal RAMP generated by the ramp compensation generator is added to a feedback signal FB to form a sum signal FB1. When the sum signal FB1 becomes smaller than a reference signal Vref, the switch M1 turns on and the switch M2 turns off. When the on-time of the switch M1 reaches a time threshold determined by an on-time control circuit, the switch M1 turns off and the switch M2 turns on.

When designing the compensation signal RAMP, there is always a tradeoff between the stability and transient response. A large compensation signal will help on the stability, but will worsen the transient response and even cause double pulse at light load.

Based on FIG. 1, the amplitude Vramp of the compensation signal RAMP can be expressed as $$V_{ramp} = \frac{V_{in} - V_{out}}{R_{ramp}C_{ramp}} t_{on} = \left(1 - \frac{V_{out}}{V_{in}}\right)\frac{V_{out}T_s}{R_{ramp}C_{ramp}} \quad (1)$$

Wherein Vin represents the input voltage, Vout represents the output voltage, ton represents the on-time of the switch M1 and Ts is the switching period.

In practical applications, the output voltage Vout and the switching period Ts are generally constant. Therefore, it is clear from the equation (1) that the amplitude Vramp will vary along with the input voltage Vin, which means that the compensation signal Vramp shown in FIG. 1 is not suitable for applications with wide input range. The ramp signal RAMP may be too small in low input situations and too large in high input situations.

SUMMARY

Embodiments of the present invention are directed to a constant on-time controller used in a switching converter, wherein the switching converter includes a first switch, a second switch, an inductor and an output capacitor, and is configured to convert an input voltage into an output voltage. The controller comprises: an on-time control circuit configured to generate an on-time control signal; a ramp compensation generator configured to generate a compensation signal; a comparing circuit coupled to the ramp compensation generator, wherein the comparing circuit compares the sum of the compensation signal and a feedback signal indicative of the output voltage with a reference signal to generate a comparison signal; a logic circuit coupled to the on-time control circuit and the comparing circuit, wherein based on the on-time control signal and the comparison signal, the logic circuit generates a control signal with a duty cycle; a driving circuit coupled to the logic circuit, wherein based on the control signal, the driving circuit generates a first driving signal and a second driving signal to respectively drive the first switch and the second switch; and a feed forward circuit configured to generate a compensation control signal based on the input voltage. The ramp compensation generator is coupled to the feed forward circuit and configured to adjust the compensation signal based on the compensation control signal.

Embodiments of the present invention are also directed to a switching converter comprising: a first switch having a first terminal, a second terminal and a control terminal, wherein the first terminal is configured to receive an input voltage; a second switch having a first terminal, a second terminal and a control terminal, wherein the first terminal is coupled to the second terminal of the first switch, the second terminal is coupled to a reference ground; an inductor having a first terminal and a second terminal, wherein the first terminal is coupled to the second terminal of the first switch and the first terminal of the second switch, the second terminal is configured to provide an output voltage; an output capacitor coupled between the second terminal of the inductor and the reference ground; an on-time control circuit configured to generate an on-time control signal; a ramp compensation generator coupled to the inductor in parallel and configured to generate a compensation signal, wherein the ramp compensation generator includes a variable resistor and a ramp capacitor serially coupled to the variable resistor; a comparing circuit coupled to the ramp compensation generator, wherein the comparing circuit compares the sum of the compensation signal and a feedback signal indicative of the output voltage with a reference signal to generate a comparison signal; a logic circuit coupled to the on-time control circuit and the comparing circuit, wherein based on the on-time control signal and the comparison signal, the logic circuit generates a control signal with a duty cycle; a driving circuit coupled to the logic circuit, wherein based on the control signal, the driving circuit provides a first driving signal and a second driving signal respectively to the control terminals of the first switch and the second switch; and a feed forward circuit, wherein based on the input voltage or the control signal, the feed forward circuit generates a compensation control signal to adjust the variable resistor in the ramp compensation generator.

Embodiments of the present invention are further directed to a method for controlling a switching converter, wherein the switching converter includes a first switch, a second switch, an inductor and an output capacitor, and is configured to convert an input voltage into an output voltage. The control method comprises: generating an on-time control signal; generating a compensation signal; comparing the sum of the compensation signal and a feedback signal indicative of the output voltage with a reference signal to generate a comparison signal; generating a control signal with a duty cycle based on the on-time control signal and the comparison signal; generating a first driving signal and a second driving signal based on the control signal to respectively drive the first switch and the second switch; generating a compensation control signal based on the duty cycle of the control signal; and adjusting the compensation signal in accordance with the compensation control signal, so the amplitude of the compensation signal can follow a critical value proportional to the difference between the duty cycle and the square of the duty cycle.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2A:
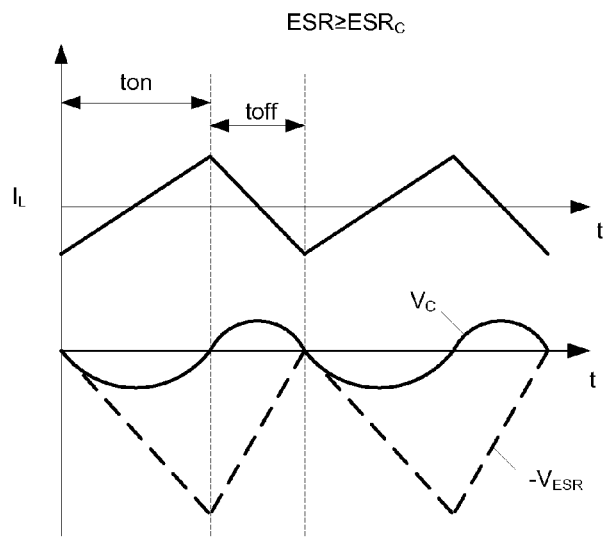
FIG. 2A illustrates working waveforms of the COT switching converter when the ESR of the output capacitor is larger than or equal to $ESR_C$.
Figure 2B:
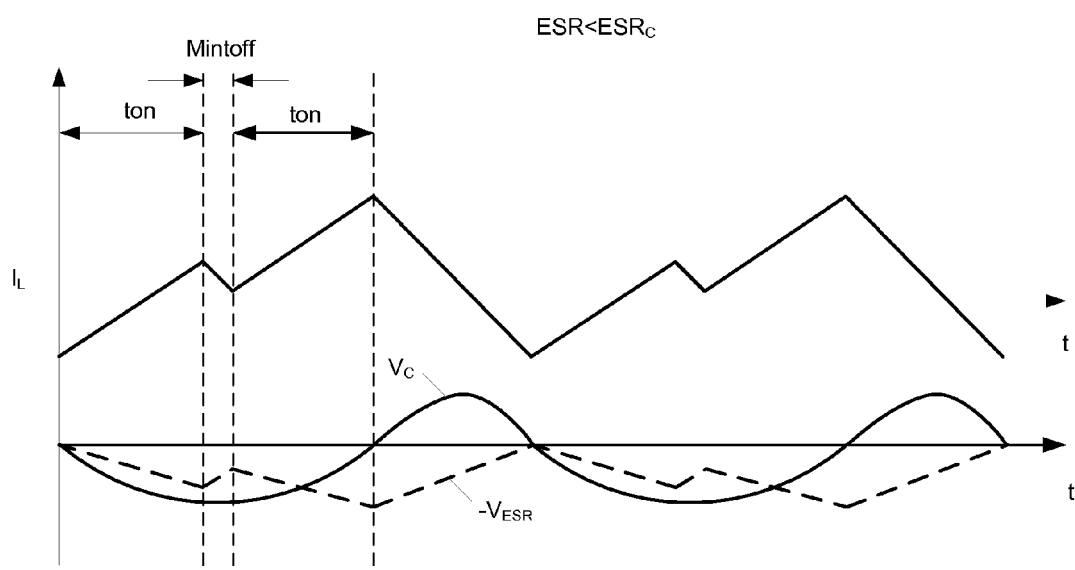
FIG. 2B illustrates working waveforms of the COT switching converter when the ESR of the output capacitor is smaller than $ESR_C$.

FIG. 2A illustrates working waveforms of the COT switching converter when the ESR of the output capacitor is larger than or equal to a critical resistance $ESR_C$, and FIG. 2B illustrates working waveforms of the COT switching converter when the ESR of the output capacitor is smaller than $ESR_C$. In these two figures, IL represents the current flowing through the inductor L, Vc represents the voltage ripple across the output capacitor Cout, VESR represents the voltage across the ESR, ton represents the on-time of the switch M1, toff represents the off-time of the switch M1, and Minoff represents the minimum off-time of the switch M1. When ESR is smaller than $ESR_C$, the voltage ripple Vc across the output capacitor Cout dominates, which leads to a sub-harmonic oscillation. When ESR is larger than or equal to $ESR_C$, the voltage VESR across the ESR dominates and the sub-harmonic oscillation is eliminated. The critical condition can be expressed as:

$$-\frac{dV_{ESR_C}}{dt}\bigg|_{t0+} = \frac{dV_C}{dt}\bigg|_{t0+} \quad (2)$$

Based on the equation (2), the critical resistance $ESR_C$ can be expressed as:

$$ESR_C = \frac{t_{on}}{2C_{out}} \quad (3)$$

The aim of involving the compensation signal RAMP is to provide compensation when ESR is smaller than $ESR_C$, so as to avoid the sub-harmonic oscillation. Hence, the compensation signal RAMP needs to be larger than or equal to the voltage of the critical resistance $ESR_C$. The critical amplitude Vrampc of the compensation signal RAMP can be expressed as:

$$V_{rampc} = ESR_C * \Delta I_L = \frac{DT_s}{2C_{out}} * \frac{V_{in} - V_{out}}{L} DT_s = (1-D)D\frac{V_{out}T_s^2}{2LC_{out}} \quad (4)$$

Where $\Delta IL$ represents the peak-peak value of the inductor current IL, and D represents the duty cycle.

Figure 1:
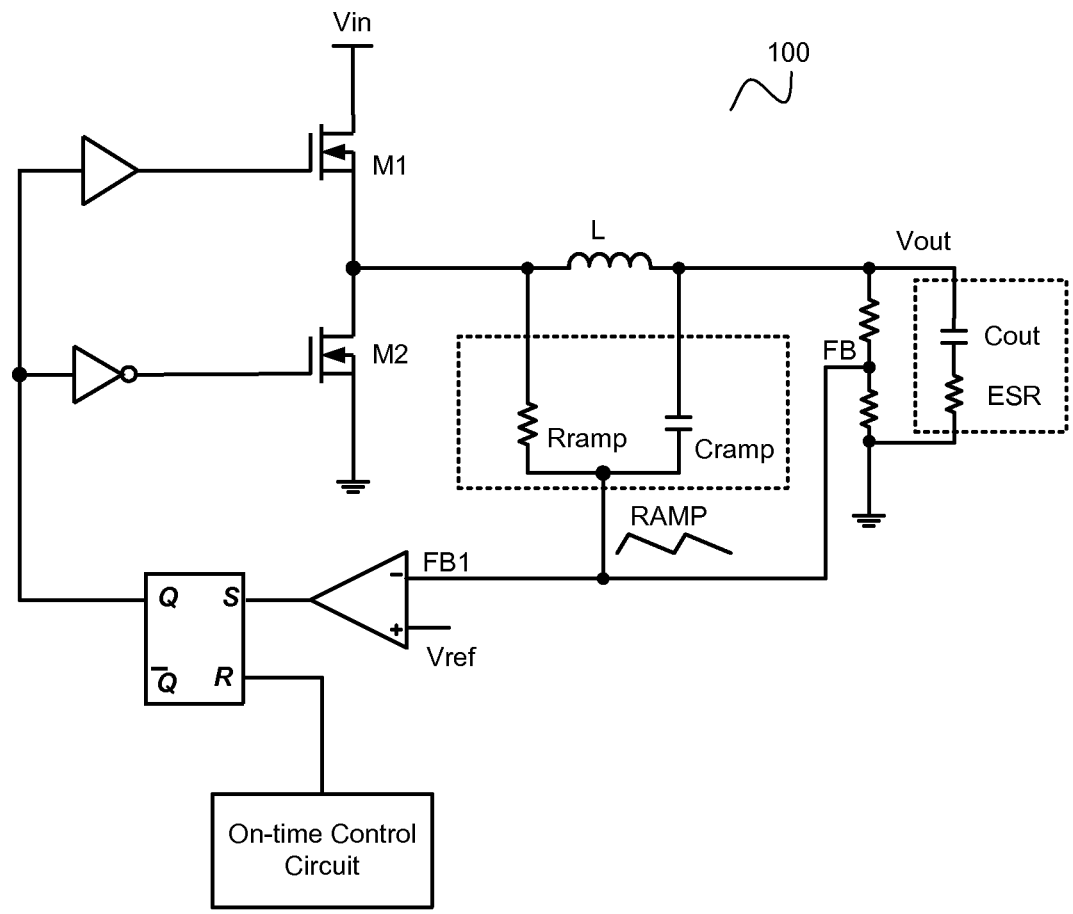
FIG. 1 illustrates a schematic of a prior COT switching converter 100.
Figure 2C:
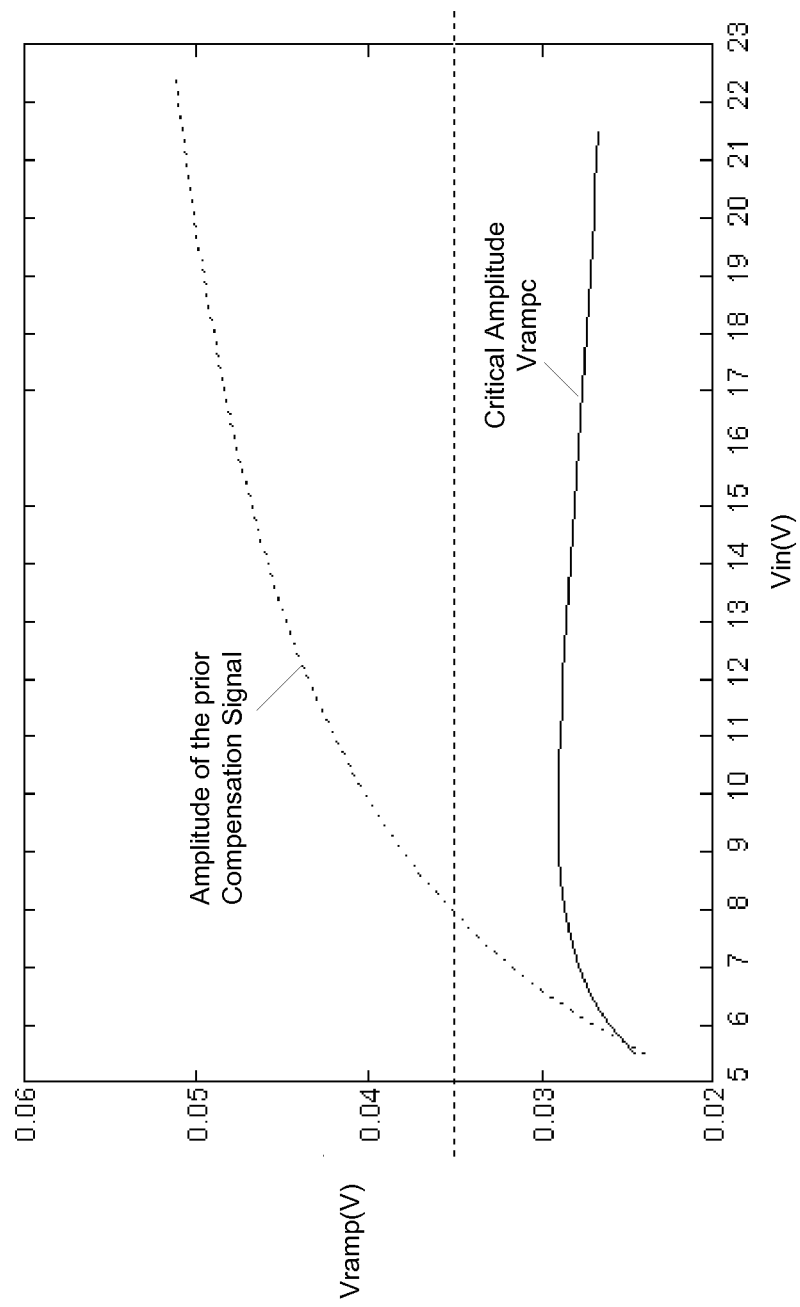
FIG. 2C illustrates the relationship between the amplitude Vramp of the compensation signal RAMP and the input voltage Vin.

FIG. 2C illustrates the relationship between the amplitude Vramp and the input voltage Vin, wherein the dotted line represents the relationship between the amplitude of the prior compensation signal and the input voltage Vin while the solid line represents the relationship between the critical amplitude Vrampc and the input voltage Vin. As shown in FIG. 2C, the amplitude of the prior compensation signal shown in FIG. 1 increases dramatically along with the input voltage Vin, which may result in insufficient compensation in lower input situations, or over compensation in higher input situations. Embodiments of the present invention thereupon adjust the compensation signal RAMP to the wide input range, e.g. by making its amplitude Vramp follow the critical amplitude Vrampc.

According to the equation (4), it can be concluded that in order to follow the critical amplitude Vrampc, the amplitude Vramp needs be proportional to (1−D)*D. Generally, Vramp can be expressed as:

$$V_{ramp} = k_r * t_{on} = k_f * t_{off} \quad (5)$$

Where kr and kf respectively represent the rising slope and falling slope of the compensation signal RAMP. The on-time and off-time of the switch M1 can be expressed as $t_{on} = D \times T_S$, $t_{off} = (1-D) \times T_S$. Combining these two equations with (4) and (5), we can get that the amplitude Vramp will follow the critical amplitude Vrampc when the rising slope kr is proportional to (1−D) or the falling slope is proportional to D.

Figure 3:
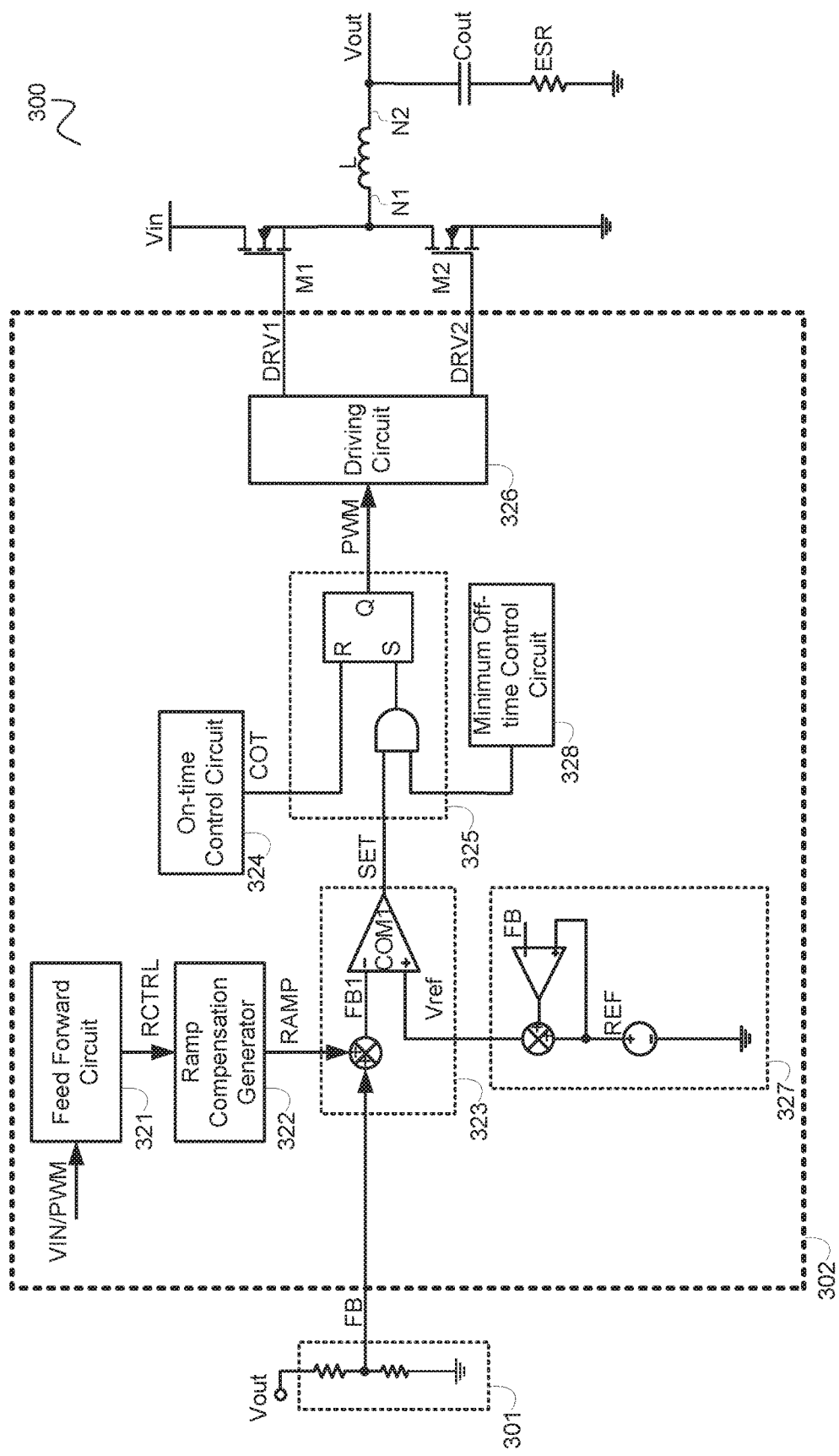
FIG. 3 illustrates a block diagram of a switching converter 300 in accordance with an embodiment of the present invention.

FIG. 3 illustrates a block diagram of a switching converter 300 in accordance with an embodiment of the present invention. The switching converter 300 comprises switches M1, M2, an inductor L, an output capacitor Cout, a feedback circuit 301 and a controller 302. In some embodiments, the controller 302 and the switches M1 and M2 are fabricated on the same chip.

In the embodiment shown in FIG. 3, the switches M1, M2, the inductor L and the output capacitor Cout constitute a synchronous BUCK converter which converts an input voltage Vin into an output voltage Vout. However, it is apparent to those skilled in the art that the second switch M2 may be replaced by a diode to form a non-synchronous BUCK converter. Moreover, the present invention is also applicable to other suitable topologies, such as Buck-Boost converter.

The feedback circuit 301 receives the output voltage Vout and generates a feedback signal FB indicative of the output voltage. The feedback circuit 301 may consist of a resistor divider, or even just a wire where the feedback signal FB is equal to the output voltage Vout.

The controller 302 comprises a feed forward circuit 321, a ramp compensation generator 322, a comparing circuit 323, an on-time control circuit 324, a logic circuit 325 and a driving circuit 326. The ramp compensation generator 322 is configured to generate a compensation signal RAMP. The comparing circuit 323 is coupled to the ramp compensation generator 322 and the feedback signal 301. It compares a sum signal FB1, which is the sum of the compensation signal RAMP and the feedback signal FB, with a reference signal Vref to generate a comparison signal SET. As can be seen from FIG. 3, the comparing circuit 323 comprises a comparator COM1 having a non-inverting input terminal, an inverting input terminal and an output terminal, wherein the non-inverting input terminal is configured to receive the reference signal Vref, the inverting input terminal is configured to receive the sum signal FB1, and the output terminal is configured to provide the comparison signal SET. In other embodiments, the compensation signal RAMP may be subtracted from the reference signal Vref instead.

The on-time control circuit 324 is configured to generate an on-time control signal COT to control the on-time of the switch M1. The on-time of the switch M1 may be a constant value or a variable value related to the input voltage Vin or the output voltage Vout. The logic circuit 325 is coupled to the on-time control circuit 324 and the comparing circuit 323, wherein based on the on-time control signal COT and the comparison signal SET, the logic circuit 325 generates a control signal PWM with a duty cycle D. The driving circuit 326 is coupled to the logic circuit 325, wherein based on the control signal PWM, the driving circuit 326 generates driving signals DRV1 and DRV2 to respectively drive the switches M1 and M2.

The feed forward circuit 321 is configured to generate a compensation control signal RCTRL based on the input voltage Vin or the control signal PWM. The ramp compensation generator 322 is coupled to the feed forward circuit 321 and configured to adjust the compensation signal RAMP based on the compensation control signal RCTRL. In one embodiment, under the control of the compensation control signal RCTRL, the amplitude Vramp of the compensation signal RAMP is adjusted to be proportional to (1−D)*D.

In some applications, the ESR of the output capacitor Cout may cause a DC error at the output voltage Vout. To solve this problem, the controller 302 further includes an error compensation circuit 327 consisting of an error amplifier and an adder. In other embodiments, the error compensation circuit 327 may only include an adder which adds a predetermined bias signal to a reference signal REF to generate the reference signal Vref provided to the comparing circuit 323.

In some embodiments, to avoid the influence of noise, the controller 302 further involves a minimum off-time control circuit 328 which is configured to block the comparison signal SET during a minimum off-time Mintoff.

Figure 4:
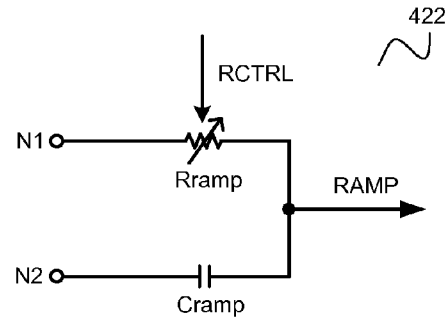
FIG. 4 schematically illustrates a ramp compensation generator 422 in accordance with an embodiment of the present invention.

FIG. 4 schematically illustrates a ramp compensation generator 422 in accordance with an embodiment of the present invention. The ramp compensation generator 422 comprises a variable resistor Rramp and a ramp capacitor Cramp. The variable resistor Rramp has a first terminal, a second terminal and a control terminal, wherein the first terminal is coupled to a first terminal N1 of the inductor shown in FIG. 3, the control terminal is coupled to the feed forward circuit to receive the compensation control signal RCTRL, and the second terminal is coupled to the comparing circuit to provide the compensation signal RAMP. The ramp capacitor Cramp has a first terminal and a second terminal, wherein the first terminal is coupled to the second terminal of the variable resistor Rramp, and the second terminal is coupled to a second terminal N2 of the inductor L.

The compensation control signal RCTRL adjusts the resistance of the variable resistor Rramp. For instance, the compensation control signal RCTRL increases the resistance of the variable resistor Rramp when the input voltage Vin increases or the duty cycle D decreases. In one embodiment, the resistance of the variable resistor Rramp is reversely proportional to duty cycle D.

Figure 5:
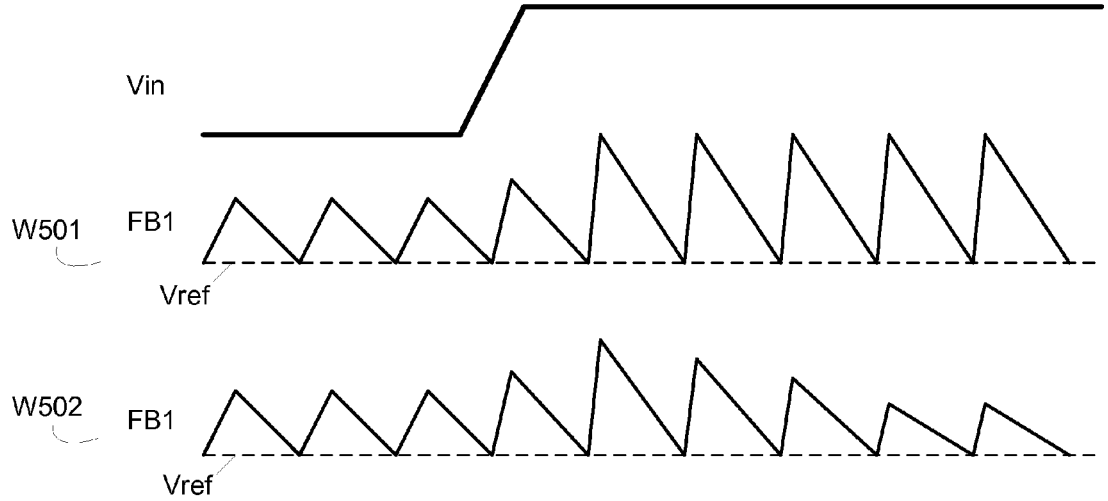
FIG. 5 illustrates working waveforms of the prior switching converter and the switching converter in accordance with embodiments of the present invention during the input voltage variation.

For certain input conditions, the resistance increase of the variable resistor Rramp will lead to a decrease in both the rising slope and the falling slope of the compensation signal RAMP, which definitely reduces the amplitude Vramp. FIG. 5 illustrates working waveforms of the prior switching converter and the switching converter in accordance with embodiments of the present invention during the variation of the input voltage, wherein W501 represents the working waveform of the prior switching converter and W502 represents the working waveform of the switching converter in accordance with embodiments of the present invention. As shown in FIG. 5, in high input situations, the amplitude of the compensation signal in accordance with embodiments of the present invention is much lower than that of the prior switching converter. So the ramp compensation at high input voltage will not be over designed while the ramp compensation at low input voltage is enough as well.

Figure 6:
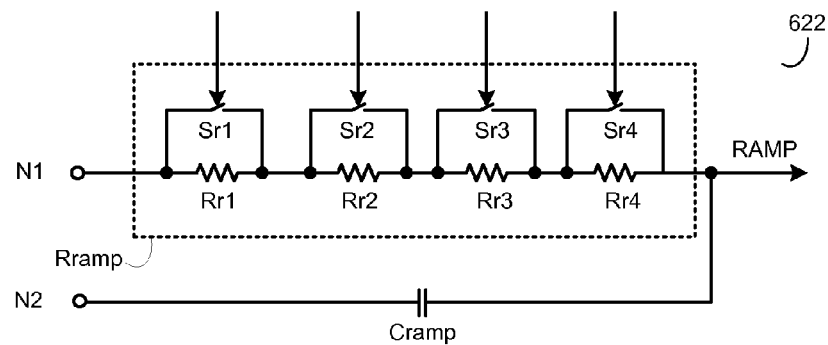
FIG. 6 schematically illustrates a ramp compensation generator 622 in accordance with an embodiment of the present invention.

FIG. 6 schematically illustrates a ramp compensation generator 622 in accordance with an embodiment of the present invention. The variable resistor Rramp comprises resistors Rr1~Rr4 and switches Sr1~Sr4. The resistors Rr1~Rr4 are serially connected. The switches Sr1-Sr4 are respectively coupled to the resistors Rr1~Rr4 in parallel and are all controlled by the feed forward circuit. When the input voltage Vin is within a first voltage range, such as 5.2V~7V, the switch Sr1 turns off and the switches Sr2~Sr4 turn on. The resistance of the variable resistor Rramp is equal to the resistance of the resistor Rr1, e.g. 270K Ω. When the input voltage Vin is within a second voltage range, such as 7V~12V, the switches Sr1 and Sr2 turn off and the switches Sr3 and Sr4 turn on. The resistance of the variable resistor Rramp is equal to the sum of the resistance of Rr1 and Rr2, e.g. 330K Ω. When the input voltage Vin is within a third voltage range, such as 12V~17V, the switches Sr1~Sr3 turn off and the switch Sr4 turns on. The resistance of the variable resistor Rramp is equal to the sum of the resistance of Rr1, Rr2 and Rr3, e.g. 650K Ω. When the input voltage Vin is within a fourth voltage range, such as 17V~22V, the switches Sr1~Sr4 all turn off. The resistance of the variable resistor Rramp is equal to the sum of the resistance of Rr1~Rr4, e.g. 750K Ω.

Figure 7:
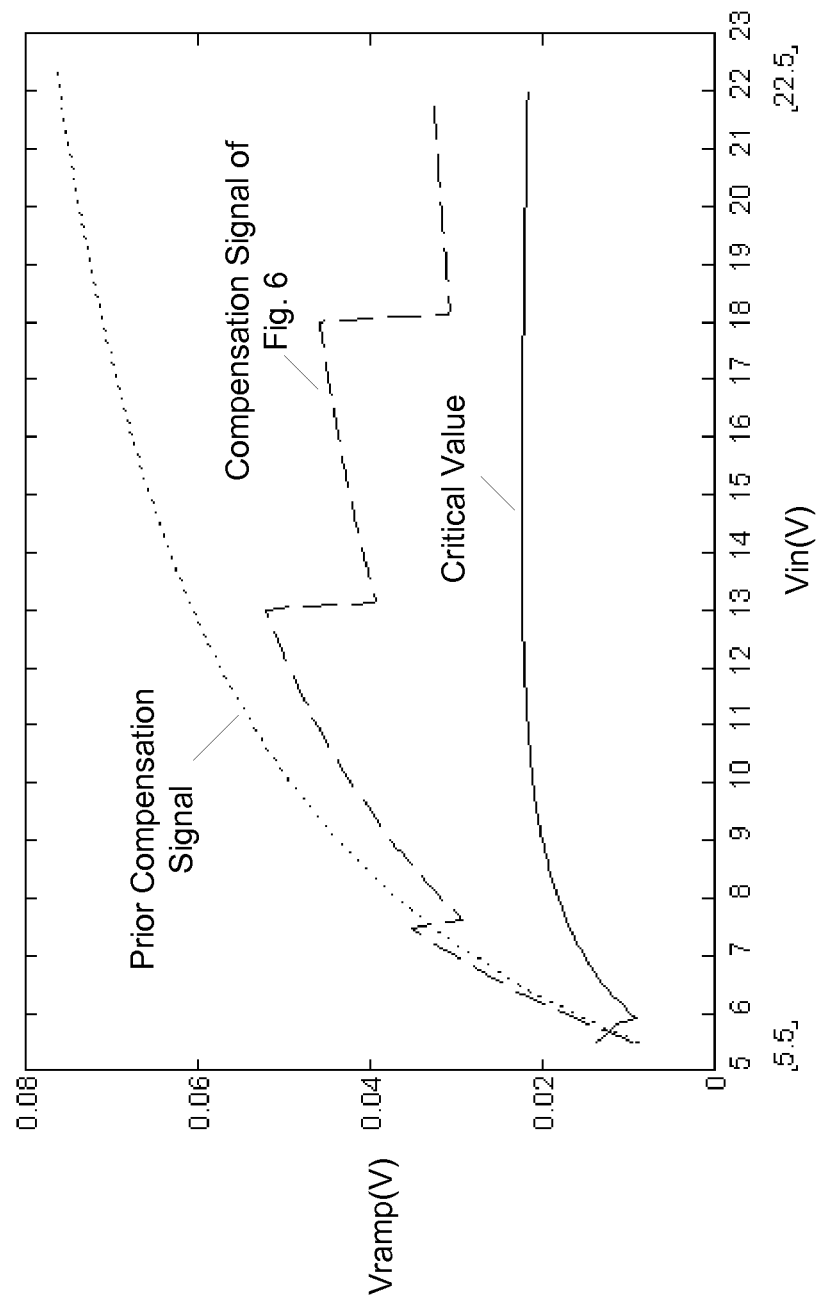
FIG. 7 illustrates the relationship between the amplitude Vramp of the compensation signal RAMP and the input voltage Vin in the embodiment shown in FIG. 6.

FIG. 7 illustrates the relationship between the amplitude Vramp of the compensation signal RAMP and the input voltage Vin in the embodiment shown in FIG. 6. As can be seen from FIG. 7, the compensation signal RAMP is piece-wise adjusted and has much lower amplitude in high input situations when compared with the prior compensation signal.

Although there are only four resistors and four switches shown in FIG. 6, persons of ordinary skill in the art can recognize that the variable resistor Rramp may comprise two, three or even more resistors and switches. These devices may be configured similarly to FIG. 7, or utilize other suitable configuration. All of these alternatives are within the spirit and do not depart from the scope of the invention.

Figure 8:
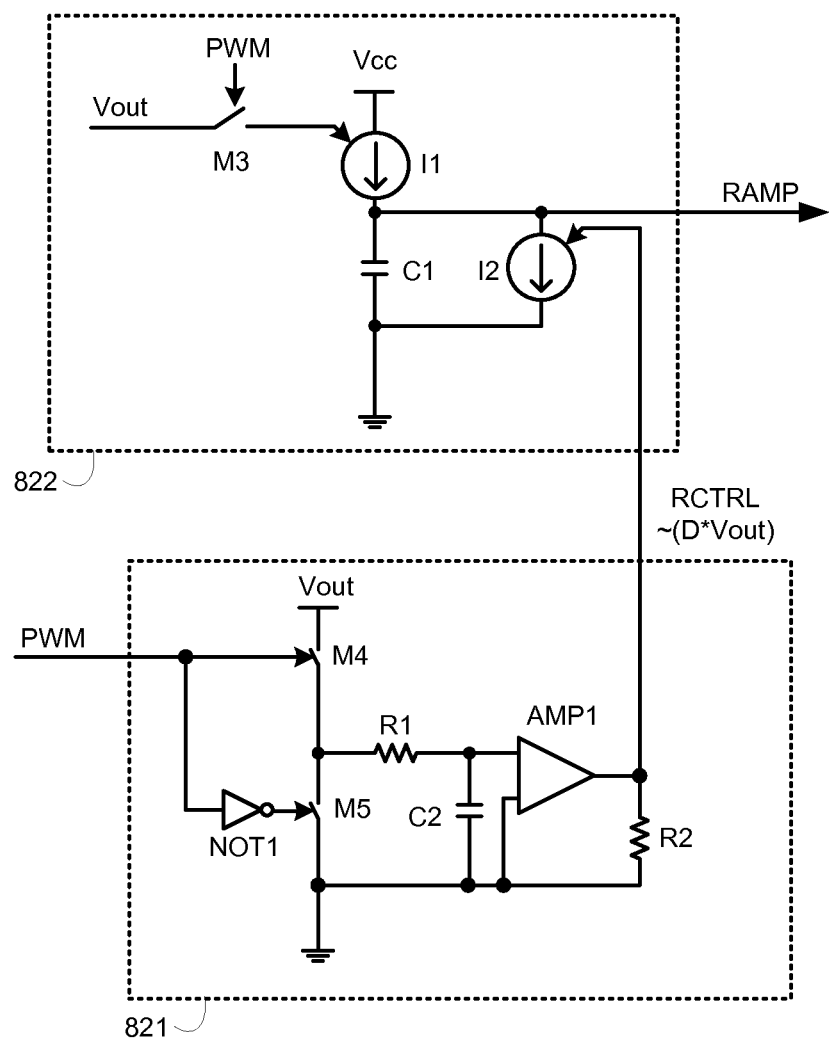
FIG. 8 schematically illustrates a feed forward circuit 821 and a ramp compensation generator 822 in accordance with an embodiment of the present invention.

FIG. 8 schematically illustrates a feed forward circuit 821 and a ramp compensation generator 822 in accordance with an embodiment of the present invention. The ramp compensation generator 822 comprises a switch M3, current sources I1, I2 and a capacitor C1. The switch M3 has a first terminal, a second terminal and a control terminal, wherein the first terminal is coupled to receive the output voltage Vout, and the control terminal is coupled to the logic circuit to receive the control signal PWM. The current source I1 has a first terminal, a second terminal and a control terminal, wherein the first terminal is configured to receive a power supply voltage Vcc, and the control terminal is coupled to the second terminal of the switch M3. When the control signal PWM is logical high, the switch M3 turns on and the current source I1 is controlled by the output voltage Vout. The current provided by the current source I1 can be expressed as:

$$I_1 = K_1 * V_{out} \quad (6)$$

K1 is the control coefficient of the current source I1.

The capacitor C1 has a first terminal and a second terminal, wherein the first terminal is coupled to the second terminal of the current source I1, and the second terminal is coupled to the reference ground. The current source I2 has a first terminal, a second terminal and a control terminal, wherein the first terminal is coupled to the second terminal of the current source I1 and the first terminal of the capacitor C1, the second terminal is coupled to the reference ground, and the control terminal is coupled to the feed forward circuit 821 to receive the compensation control signal RCTRL. The current source I2 is controlled by the compensation control signal RCTRL, and its current can be expressed as:

$$I_2 = K_2 * RCTRL \quad (7)$$

K2 is the control coefficient of the current source I2.

The feed forward circuit 821 comprises switches M4, M5, an inverting gate NOT1, resistors R1, R2, a capacitor C2 and an amplifier AMP1. The switch M4 has a first terminal, a second terminal and a control terminal, wherein the first terminal is configured to receive the output voltage Vout, and the control terminal is coupled to the logic circuit to receive the control signal PWM. The inverting gate NOT1 has an input terminal and an output terminal, wherein the input terminal is coupled to the logic circuit to receive the control signal PWM. The switch M5 has a first terminal, a second terminal and a control terminal, wherein the first terminal is coupled to the second terminal of the switch M4, the second terminal is coupled to the reference ground, and the control terminal is coupled to the output terminal of the inverting gate NOT1. The resistor R1 has a first terminal and a second terminal, wherein the first terminal is coupled to the second terminal of the switch M4 and the first terminal of the switch M5. The capacitor C2 has a first terminal and a second terminal, wherein the first terminal is coupled to the second terminal of the resistor R1, and the second terminal is coupled to the reference ground. The amplifier AMP1 having a non-inverting input terminal, an inverting input terminal and an output terminal, wherein the non-inverting input terminal is coupled to the second terminal of the resistor R1 and the first terminal of the capacitor C2, the second input terminal is coupled to the reference ground, and the output terminal is coupled to the control terminal of the current source I2 to provide the compensation control signal RCTRL. The resistor R2 is coupled between the output terminal of the amplifier AMP1 and the reference ground. Based on the configuration of the feed forward circuit 821, the compensation control signal RCTRL can be expressed as:

$$RCTRL = DV_{out} G_m R_2 \quad (8)$$

Where Gm is the gain of the amplifier AMP1.

When the control signal PWM is logical high, the switch M3 turns on and the current flowing through the capacitor C1 is (I1−I2). Consequently, the amplitude Vramp of the compensation signal RAMP can be expressed as:

$$V_{ramp} = \frac{I_1 - I_2}{C_1} * t_{on} = \frac{K_1 V_{out} - K_2 D V_{out} G_m R_2}{C_1} * DT_s \quad (9)$$

The coefficient K1 is designed as:

$$K_1 = K_2 G_m R_2 \quad (10)$$

Thus the equation (9) can be simplified as:

$$V_{ramp} = \frac{(1-D)D}{C_1} * K_1 V_{out} T_s \quad (11)$$

Based on the equation (11), it can be understood that the amplitude Vramp in the embodiment shown in FIG. 8 is proportional to (1−D)*D, thus can follow the critical amplitude Vrampc and adapt well to the wide input range.

Figure 9:
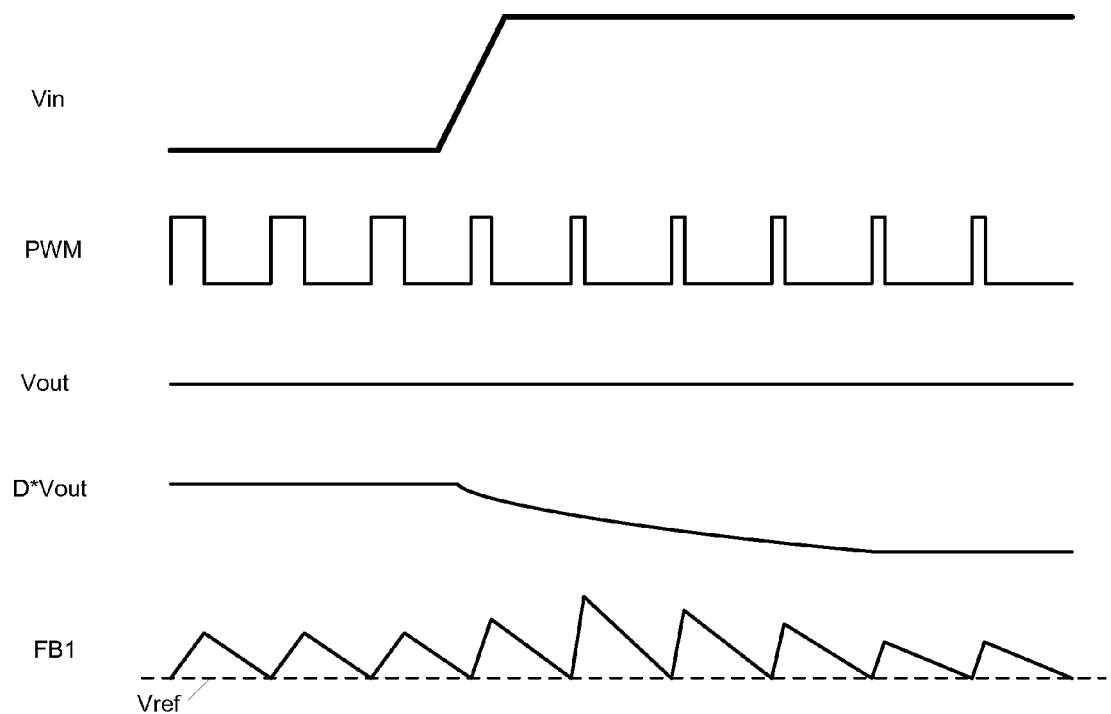
FIG. 9 illustrates working waveforms of the circuit shown in FIG. 8 when the input voltage varies.

FIG. 9 illustrates working waveforms of the circuit shown in FIG. 8 when the input voltage varies. As shown in the figure, when the input voltage Vin increases, the compensation control signal RCTRL as well as the duty cycle D decreases. Being adjusted by the compensation control signal RCTRL, the ramp signal RAMP gradually reaches a proper value.

Figure 10A:
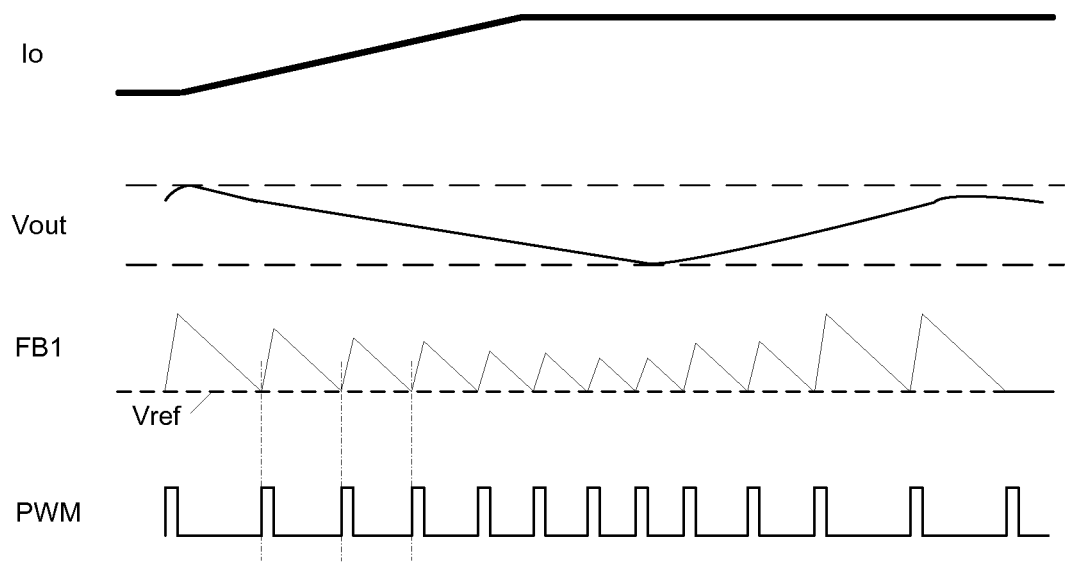
FIG. 10A illustrates working waveforms of the prior switching converter during load transient change in high input situations.
Figure 10B:
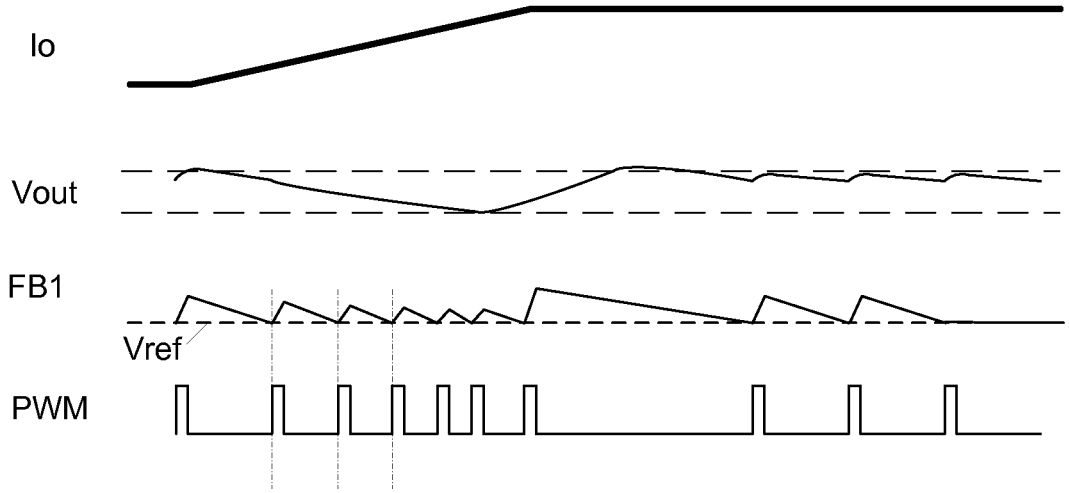
FIG. 10B illustrates working waveforms of the switching converter in accordance with embodiments of the present invention during load transient change in high input situations.

Embodiments of the present invention adjust the compensation signal RAMP according to the input voltage Vin. It is clear from FIG. 5 that the amplitude of the ramp signal is reduced compared with the prior art in high input situations. FIGS. 10A and 10B respectively illustrate working waveforms of the prior switching converter and the switching converter in accordance with embodiments of the present invention during load transient change in high input situations, wherein Io represents the output current. Comparing FIG. 10A with 10B, it is apparent that the transient response of the switching converter in accordance with embodiments of the present invention is much quicker than that of the prior switching converter due to the lower amplitude.

Figure 11:
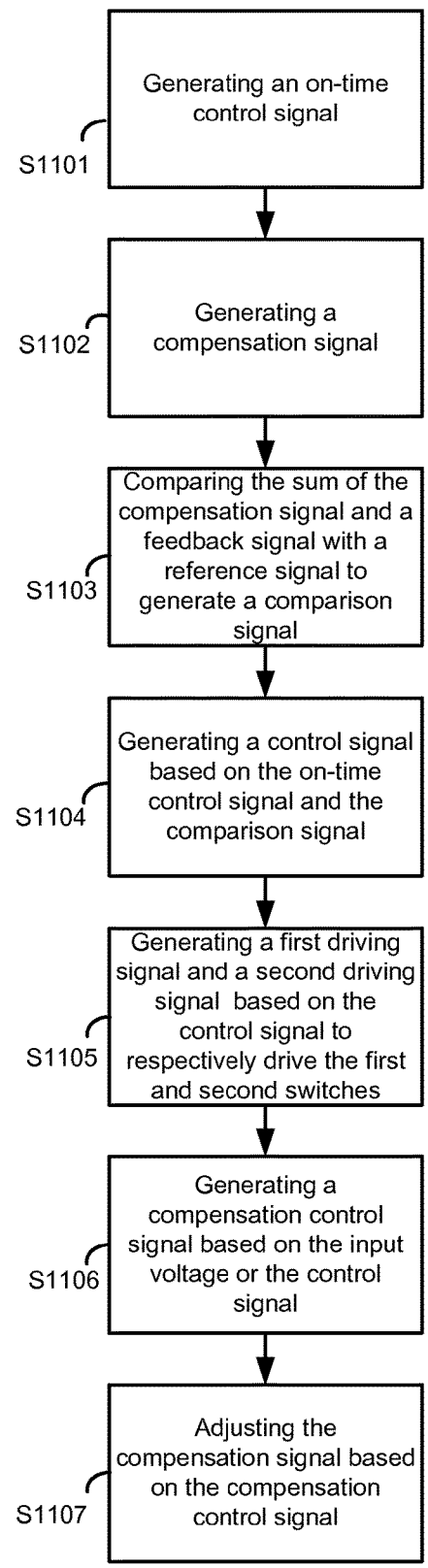
FIG. 11 illustrates a flow chart of a method for controlling a switching converter in accordance with an embodiment of the present invention.

FIG. 11 illustrates a flow chart of a method for controlling a switching converter in accordance with an embodiment of the present invention. The switching converter includes a first switch, a second switch, an inductor and an output capacitor and is configured to convert an input voltage into an output voltage. This control method comprises steps S1101~S1107.

At step S1101, an on-time control signal is generated.

At step S1102, a compensation signal to provide a ramp compensation is generated.

At step S1103, the sum of the compensation signal and a feedback signal indicative of the output voltage is compared with a reference signal to generate a comparison signal.

At step S1104, a control signal with a duty cycle D is generated based on the on-time control signal and the comparison signal.

At step S1105, a first driving signal and a second driving signal are generated based on the control signal to respectively drive the first switch and the second switch.

At step S1106, a compensation control signal is generated based on the input voltage or the control signal, e.g. the duty cycle D of the control signal.

At step S1107, the compensation signal is adjusted in accordance with the compensation control signal, so the amplitude of the compensation signal can follow a critical value proportional to D*(1−D).

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A constant on-time controller used in a switching converter, wherein the switching converter includes a first switch, a second switch, an inductor and an output capacitor, and is configured to convert an input voltage into an output voltage, the controller comprises:

an on-time control circuit configured to generate an on-time control signal;

a ramp compensation generator configured to generate a compensation signal;

a comparing circuit coupled to the ramp compensation generator, wherein the comparing circuit compares the sum of the compensation signal and a feedback signal indicative of the output voltage with a reference signal to generate a comparison signal;

a logic circuit coupled to the on-time control circuit and the comparing circuit, wherein based on the on-time control signal and the comparison signal, the logic circuit generates a control signal with a duty cycle;

a driving circuit coupled to the logic circuit, wherein based on the control signal, the driving circuit generates a first driving signal and a second driving signal to respectively drive the first switch and the second switch; and a feed forward circuit configured to generate a compensation control signal based on the input voltage; wherein the ramp compensation generator is coupled to the feed forward circuit and configured to adjust the compensation signal based on the compensation control signal, so the amplitude of the compensation signal follows a critical value proportional to the difference between the duty cycle and the square of the duty cycle.

2. The controller of claim 1, wherein the rising slope of the compensation signal is proportional to the difference between 1 and the duty cycle, and the falling slope of the compensation signal is proportional to the duty cycle.

3. The controller of claim 1, wherein the ramp compensation generator comprises:

a variable resistor having a first terminal, a second terminal and a control terminal, wherein the first terminal is coupled to a first terminal of the inductor, the control terminal is coupled to the feed forward circuit to receive the compensation control signal, and the second terminal is coupled to the comparing circuit to provide the compensation signal; and a ramp capacitor having a first terminal and a second terminal, wherein the first terminal is coupled to the second terminal of the variable resistor, and the second terminal is coupled to a second terminal of the inductor.

4. The controller of claim 3, wherein the variable resistor comprises:

a plurality of serial-connected resistors; and a plurality of switches respectively coupled to the plurality of serial-connected resistors in parallel.

5. The controller of claim 1, wherein the ramp compensation generator comprises:

a third switch having a first terminal, a second terminal and a control terminal, wherein the first terminal is coupled to receive the output voltage, and the control terminal is coupled to the logic circuit to receive the control signal;

a first current source having a first terminal, a second terminal and a control terminal, wherein the first terminal is configured to receive a power supply voltage, and the control terminal is coupled to the second terminal of the third switch;

a first capacitor having a first terminal and a second terminal, wherein the first terminal is coupled to the second terminal of the first current source, and the second terminal is coupled to a reference ground; and a second current source having a first terminal, a second terminal and a control terminal, wherein the first terminal is coupled to the second terminal of the first current source and the first terminal of the first capacitor, the second terminal is coupled to the reference ground, and the control terminal is coupled to the feed forward circuit to receive the compensation control signal, and wherein the compensation control signal is proportional to the product of the duty cycle and the output voltage.

6. The controller of claim 5, wherein the feed forward circuit comprises:
a fourth switch having a first terminal, a second terminal and a control terminal, wherein the first terminal is configured to receive the output voltage, and the control terminal is coupled to the logic circuit to receive the control signal;
an inverting gate having an input terminal and an output terminal, wherein the input terminal is coupled to the logic circuit to receive the control signal;
a fifth switch having a first terminal, a second terminal and a control terminal, wherein the first terminal is coupled to the second terminal of the fourth switch, the second terminal is coupled to the reference ground, and the control terminal is coupled to the output terminal of the inverting gate;
a first resistor having a first terminal and a second terminal, wherein the first terminal is coupled to the second terminal of the fourth switch and the first terminal of the fifth switch;
a second capacitor having a first terminal and a second terminal, wherein the first terminal is coupled to the second terminal of the first resistor, and the second terminal is coupled to the reference ground;
an amplifier having a first input terminal, a second input terminal and an output terminal, wherein the first input terminal is coupled to the second terminal of the first resistor and the first terminal of the second capacitor, the second input terminal is coupled to the reference ground, and the output terminal is coupled to the control terminal of the second current source to provide the compensation control signal; and
a second resistor coupled between the output terminal of the amplifier and the reference ground.

7. A switching converter comprising:
a first switch having a first terminal, a second terminal and a control terminal, wherein the first terminal is configured to receive an input voltage;
a second switch having a first terminal, a second terminal and a control terminal, wherein the first terminal is coupled to the second terminal of the first switch, the second terminal is coupled to a reference ground;
an inductor having a first terminal and a second terminal, wherein the first terminal is coupled to the second terminal of the first switch and the first terminal of the second switch, the second terminal is configured to provide an output voltage;
an output capacitor coupled between the second terminal of the inductor and the reference ground;
an on-time control circuit configured to generate an on-time control signal;
a ramp compensation generator coupled to the inductor in parallel and configured to generate a compensation signal, wherein the ramp compensation generator includes a variable resistor and a ramp capacitor serially coupled to the variable resistor;
a comparing circuit coupled to the ramp compensation generator, wherein the comparing circuit compares the sum of the compensation signal and a feedback signal indicative of the output voltage with a reference signal to generate a comparison signal;
a logic circuit coupled to the on-time control circuit and the comparing circuit, wherein based on the on-time control signal and the comparison signal, the logic circuit generates a control signal with a duty cycle;
a driving circuit coupled to the logic circuit, wherein based on the control signal, the driving circuit provides a first driving signal and a second driving signal respectively to the control terminals of the first switch and the second switch; and
a feed forward circuit, wherein based on the input voltage or the control signal, the feed forward circuit generates a compensation control signal to adjust the variable resistor in the ramp compensation generator.

8. The switching converter of claim 7, wherein the resistance of the variable resistor is increased when the input voltage increases or the duty cycle decreases.

9. The switching converter of claim 7, wherein the resistance of the variable resistor is inversely proportional to the duty cycle.

10. The switching converter of claim 7, wherein the variable resistor comprises:
a plurality of serial-connected resistors; and
a plurality of switches respectively coupled to the plurality of serial-connected resistors in parallel.

11. The switching converter of claim 7, wherein the second switch is replaced by a diode.

12. A method for controlling a switching converter, wherein the switching converter includes a first switch, a second switch, an inductor and an output capacitor, and is configured to convert an input voltage into an output voltage, the control method comprises:
generating an on-time control signal;
generating a compensation signal;
comparing the sum of the compensation signal and a feedback signal indicative of the output voltage with a reference signal to generate a comparison signal;
generating a control signal with a duty cycle based on the on-time control signal and the comparison signal;
generating a first driving signal and a second driving signal based on the control signal to respectively drive the first switch and the second switch;
generating a compensation control signal based on the duty cycle of the control signal; and
adjusting the compensation signal in accordance with the compensation control signal, so the amplitude of the compensation signal can follow a critical value proportional to the difference between the duty cycle and the square of the duty cycle.

* * * * *